United States Patent
Berechet et al.

(10) Patent No.: US 10,339,698 B2
(45) Date of Patent: Jul. 2, 2019

(54) METHOD FOR DISCRIMINATION AND IDENTIFICATION OF OBJECTS OF A SCENE BY 3-D IMAGING

(71) Applicants: THALES, Courbevoie (FR); UNIVERSITE DE LORRAINE, Nancy (FR); SISPIA, Vincennes (FR)

(72) Inventors: Stefan Berechet, Joinville le Pont (FR); Ion Berechet, Vincennes (FR); Jean-Baptiste Bellet, Metz (FR); Gérard Berginc, Thiais (FR)

(73) Assignees: THALES, Courbevoie (FR); UNIVERSITE DE LORRAINE, Nancy (FR); SISPIA, Vincennes (FR)

( * ) Notice: Subject to any disclaimer, the term of this patent is extended or adjusted under 35 U.S.C. 154(b) by 44 days.

(21) Appl. No.: 15/534,869

(22) PCT Filed: Dec. 17, 2015

(86) PCT No.: PCT/EP2015/080258
§ 371 (c)(1),
(2) Date: Jun. 9, 2017

(87) PCT Pub. No.: WO2016/097168
PCT Pub. Date: Jun. 23, 2016

(65) Prior Publication Data
US 2017/0345204 A1    Nov. 30, 2017

(30) Foreign Application Priority Data

Dec. 19, 2014  (FR) .................................... 14 02929

(51) Int. Cl.
*G06T 15/08* (2011.01)
*G06T 7/136* (2017.01)
*G06T 7/11* (2017.01)

(52) U.S. Cl.
CPC ............... *G06T 15/08* (2013.01); *G06T 7/11* (2017.01); *G06T 7/136* (2017.01); *G06T 2207/10072* (2013.01); *G06T 2219/2021* (2013.01)

(58) Field of Classification Search
None
See application file for complete search history.

(56) References Cited

U.S. PATENT DOCUMENTS

| 8,345,960 B2 | 1/2013 | Berginc et al. |
| 8,836,762 B2 | 9/2014 | Berginc et al. |

(Continued)

FOREIGN PATENT DOCUMENTS

| CA | 2 365 062 A1 | 6/2003 |
| EP | 2 333 481 A1 | 6/2011 |
| WO | 2007/103216 A2 | 9/2007 |

OTHER PUBLICATIONS

Weidong Zhang et al., "Mesenteric Vasculature-Guided Small Bowel Segmentation on 3-D CT," IEEE Transactions on Medical Imaging, vol. 32, No. 11, Nov. 1, 2013, pp. 2006-2021, XP011535593.

*Primary Examiner* — Tize Ma
(74) *Attorney, Agent, or Firm* — Baker & Hostetler LLP (57) ABSTRACT

A method for discriminating and identifying, by 3D imaging, an object in a complex scene comprises the following steps: generating a sequence of 2D MIP images of the object, from a 3D voxel volume of the complex scene, this volume visualized by an operator by using an iterative process of MIP type from a projection plane and an intensity threshold determined by the operator on each iteration, automatically extracting, from the sequence of images, coordinates of a reduced volume corresponding to the sequence of images, choosing one of the intensity thresholds used during the iterations, automatically extracting, from the 3D volume of the complex scene, from the coordinates and chosen inten- (Continued)

sity threshold, a reduced 3D volume containing the object, automatically generating, from the reduced volume, by intensity threshold optimization, an optimized intensity threshold and an optimized voxel volume, a color being associated with each intensity, identifying the object by visualization.

6 Claims, 9 Drawing Sheets

(56) References Cited

U.S. PATENT DOCUMENTS

| | | | |
|---|---|---|---|
| 2005/0163358 A1* | 7/2005 | Moeller | G06K 9/342 382/128 |
| 2009/0129641 A1* | 5/2009 | Zhou | G06T 19/00 382/128 |
| 2010/0074532 A1* | 3/2010 | Gordon | G01B 11/25 382/203 |
| 2013/0100131 A1 | 4/2013 | Berechet et al. | |
| 2014/0164989 A1 | 6/2014 | Kuhne | |
| 2015/0123973 A1* | 5/2015 | Larsen | G06T 15/04 345/427 |

\* cited by examiner

METHOD FOR DISCRIMINATION AND IDENTIFICATION OF OBJECTS OF A SCENE BY 3-D IMAGING

CROSS-REFERENCE TO RELATED APPLICATIONS

This application is a National Stage of International patent application PCT/EP2015/080258, filed on Dec. 17, 2015, which claims priority to foreign French patent application No. FR 1402929, filed on Dec. 19, 2014, the disclosures of which are incorporated by reference in their entirety.

FIELD OF THE INVENTION

Figure 4:
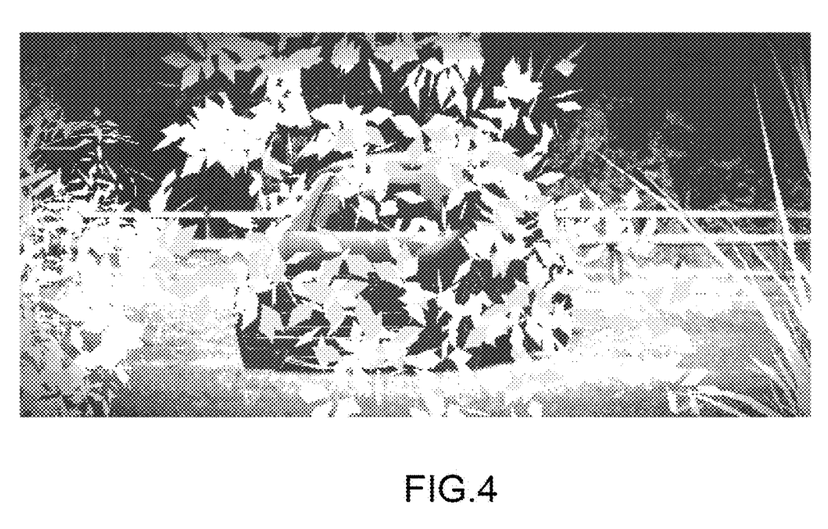
FIG. 4 shows an example of 2D image of a complex scene.

The field of the invention is that of the discrimination and identification of any objects which may be hidden in a complex scene as illustrated in FIG. 4. These objects may mask one another, which renders the identification and the discrimination of the objects particularly difficult.

BACKGROUND

There are different types of three-dimensional visualization. Some visualizations offer a depth image, or 2.5 D image. These techniques do not make it possible to recover all the three-dimensional voxels ("volumetric pixels"), they are founded on the stereoscopic techniques linked to the optimization of a difference of progression of the optical or electromagnetic ray between the different points of two images; this difference of progression can be calculated if the objects are situated at a short range from the imaging system. The identification is therefore limited to short distances.

Some imaging techniques require a laser beam or light scanning over the scene, and a sequence of measurements gives a 3D cloud of points. Several scans with different viewing angles are necessary to obtain three-dimensional information but the relative motion of the carrier containing the scanning system produces a distortion from point cloud to point cloud, the realignment is complex and degrades the resolution and the identification.

The so-called silhouette techniques, with silhouettes obtained from multiple views give an outer envelope with little detail. If the objects contain a shadow zone or if an object is located in the shadow of another object, a large part of the envelope is lost, therefore the identification and the discrimination of the two objects is not feasible.

The Spin Image type technologies require databases and cannot be applied for objects concealed in complex scenes without a priori knowledge.

The voxel grouping techniques associated with isodensity surface reconstruction make it possible to obtain the outer surface of the objects but eliminate the internal information contained in the object.

The three-dimensional reconstruction techniques linked to a knowledge base optimization and to the extraction of weak signals and an example of which is presented in document "Method for the three-dimensional synthetic reconstruction of objects exposed to an electromagnetic and/or elastic wave" (EP 2 929 421 or U.S. Pat. No. 8,345,960), require databases and for them to be optimized in order to produce the best possible three-dimensional reconstruction. The knowledge bases often represent the objects only by a set of external three-dimensional surfaces which can be modeled by facets. The transparent structures (windows, etc.) are poorly taken into account, which greatly impairs the complete display of the object in 3D. These techniques are also dependent on the availability of the knowledge bases.

The MIP (Maximum Intensity Projection) technique allows for the 2D visualization of three-dimensional data. This technique projects the voxels onto a projection plane; the voxels are determined by the rays meeting the projection plane at the point of observation with an imposed intensity threshold. The 2D results do not make it possible to obtain a value for the depth and the distances. To create an illusion of rotation and a concept of depth and thus enhance the 3D rendering, several projection planes are produced with successive observation angles.

The voxel intensity rendering techniques allow for a noisy three-dimensional visualization, which reduces the discrimination between different contiguous of the observed scene.

The 3D clouds of points obtained directly by a Cartesian positioning of the voxels allow only a weak discrimination and provide artefacts associated with the false alarms.

The surface completion techniques, an example of which is presented in the document "Method for 3D reconstruction of an object of a scene" (US2013/0100131), make it possible to fill the incomplete zones by three-dimensional surface generation to obtain a set of completed data of the object, without recourse to an external database. They thus give a complete external surface of the object without surface discontinuity; the internal data situated behind transparent objects (windows for example) are not reconstructed and are eliminated from the identification process. A process for discriminating two close objects is more difficult to achieve, because the generation of surfaces can be mathematically complex.

SUMMARY OF THE INVENTION

The aim of the invention is to mitigate these drawbacks.

More specifically, the subject of the invention is a method for discriminating and identifying, by 3D imaging, an object in a complex scene. It is primarily characterized in that it comprises the following steps:

generating a sequence of images called 2D MIP images of the object, from a 3D voxel volume of the complex scene, this volume being predetermined and visualized by an operator by using an iterative process of MIP type from a projection plane and an intensity threshold determined by the operator on each iteration, automatically extracting, from the sequence of 2D MIP images, coordinates of a reduced volume corresponding to the sequence of 2D MIP images, choosing one of the intensity thresholds used during the iterations of the process of MIP type, automatically extracting, from the 3D voxel volume of the complex scene, from the coordinates and from the chosen intensity threshold, a reduced 3D voxel volume containing the object, automatically generating, from the reduced volume, by intensity threshold optimization, an optimized intensity threshold and an optimized voxel volume, a color being associated with each intensity, identifying the object by visualization.

It optionally comprises a step of visualization of the reduced 3D voxel volume and/or of the optimized voxel volume.

According to a feature of the invention, it further comprises a step for generating, from the sequence of 2D MIP images, from the coordinates and from the chosen intensity threshold, a 3D cloud of points (8) of the object.

According to another feature of the invention, it comprises it further comprises the following steps:

generating, from the 3D volume of the complex scene and from the chosen intensity threshold, a raw 3D cloud of points of the complex scene, generating, from the optimized 3D volume and from the optimized intensity threshold, an optimized 3D cloud of points of the object, generating, from an overlaying of the raw 3D cloud of points of the scene, of the optimized 3D cloud of points of the object, and possibly of the 3D cloud of points of the object, an optimized global 3D cloud of points of the object included in the complex scene, visualizing the optimized global 3D cloud.

These clouds can also be visualized by the operator.

The method according to the invention allows for a discrimination, an identification and possibly a positioning of the object. The accuracy of the details of the object is made possible by the densification of the cloud of points, which also makes it possible to improve the identification of the object of the scene. The three-dimensional clouds of points make it possible to separate and discriminate the different objects of the scene and to discriminate the object to be identified by the other elements of the scene. The set of the clouds of points associated with the object is positioned in an absolute Cartesian reference frame, which makes it possible to simply calculate the positions of the object and the different distances between the object and other elements of the scene. The object is replaced in its operational context.

The solution provided makes up for the individual shortcomings of each existing visualization technique. There is no need to complete the data (notably the data masked by other elements of the scene) because they are implicitly present.

BRIEF DESCRIPTION OF THE DRAWINGS

Other features and advantages of the invention will become apparent on reading the following detailed description, given as a nonlimiting example and with reference to the attached drawings in which.

From one figure to another, the same elements are identified by the same references.

DETAILED DESCRIPTION

Figure 1:
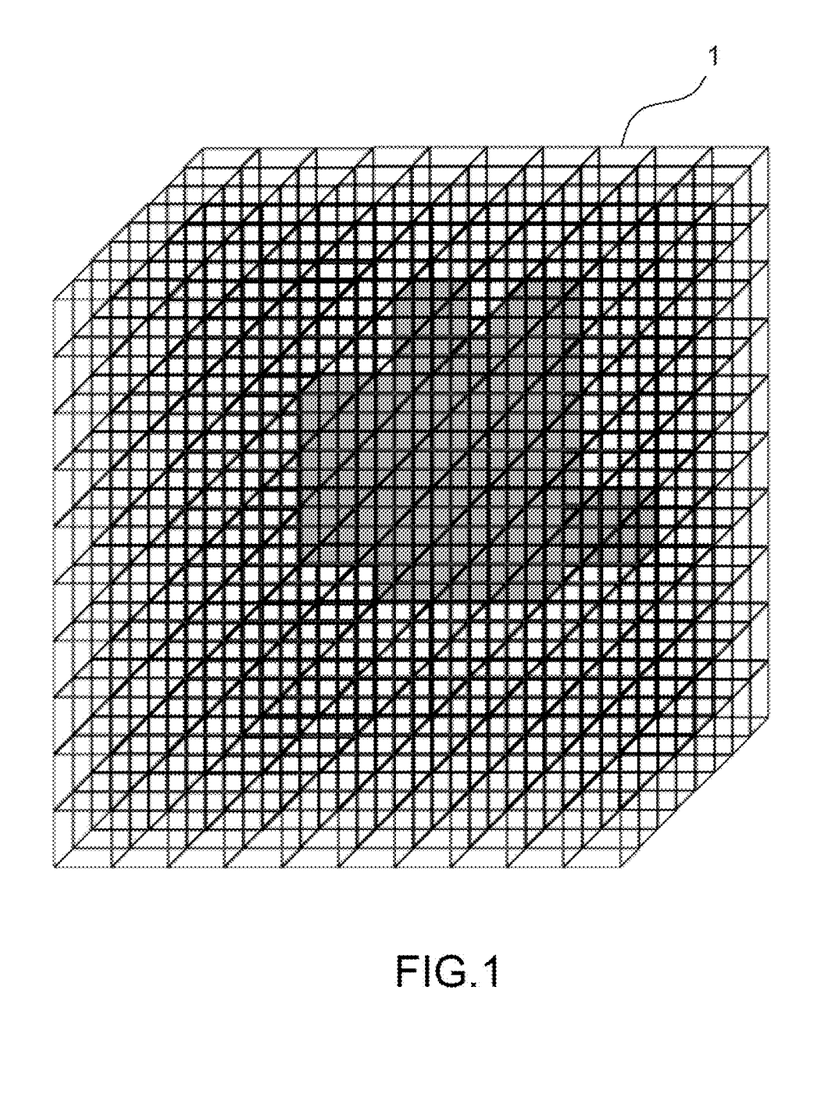
FIG. 1 schematically represents an example of 3D volume with the meshing corresponding to the different voxels, obtained by 3D reconstruction.

The method according to the invention is applied to a 3D voxel volume of a complex scene. This scene has therefore been previously transformed by 3D imaging into this 3D volume (1), an example of which is shown in FIG. 1.

This three-dimensional volume can be obtained using a method of reconstruction by transmission or by fluorescence (Optical Projection Tomography, nuclear imaging or X-Ray Computed Tomography) or by reflection (reflection of a laser wave or by solar reflection in the case of the visible band (between 0.4 µm and 0.7 µm) or near infrared (between 0.7 µm and 1 µm or SWIR between 1 µm and 3 µm) or by taking into account the thermal emission of the object (thermal imaging between 3 µm and 5 µm and between 8 µm and 12 µm), this three-dimensional reconstruction process is described in the patent "Optronic system and method for creating three-dimensional identification images" (U.S. Pat. No. 8,836,762, EP 2 333 481).

All the voxels obtained from a three-dimensional reconstruction are used with the associated intensity, this reconstruction preferably having been obtained by reflection.

Figure 2:
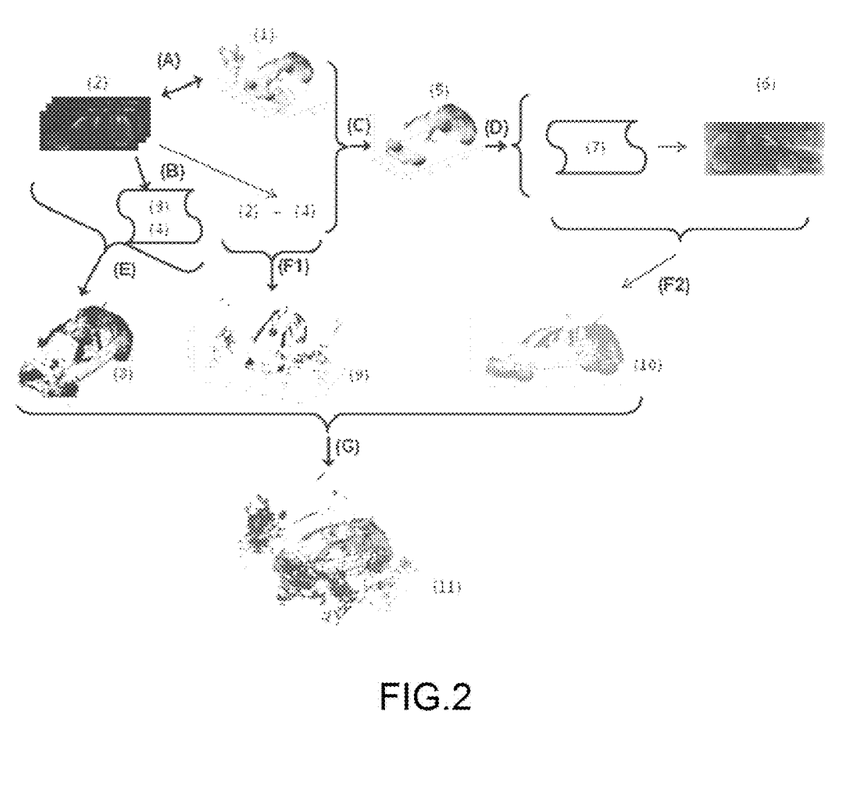
FIG. 2 shows an example of sequencing of the different steps of the method according to the invention.
Figure 11A:
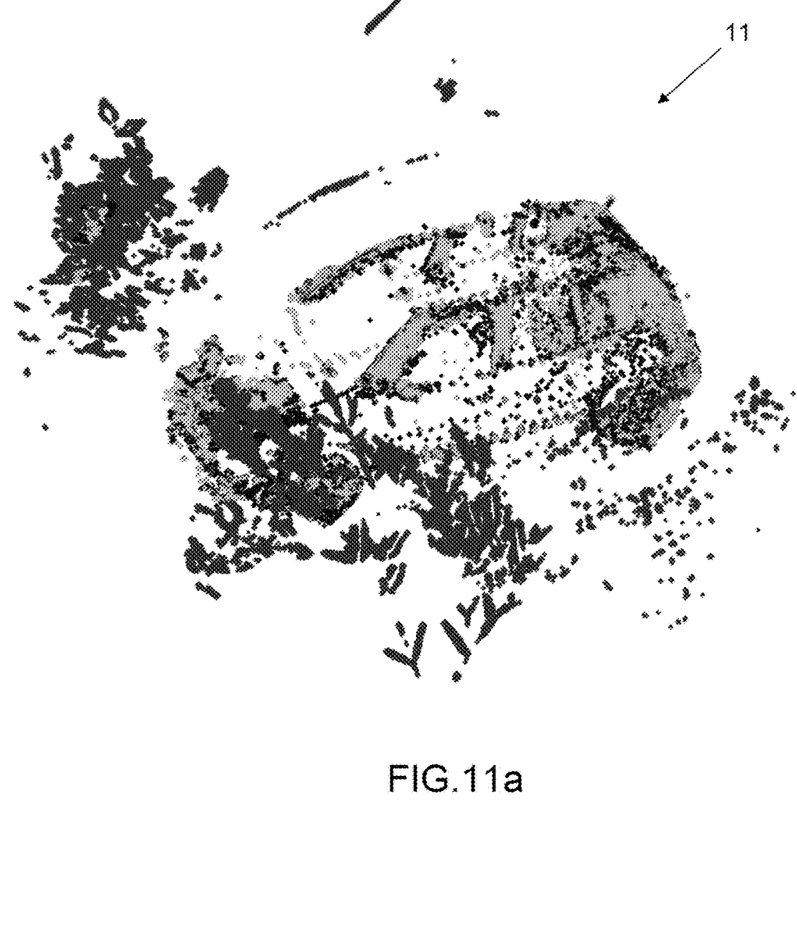
FIGS. 11a and 11b show an example of 3D visualization of an optimized global 3D cloud of points of the object in the complex scene, with, as object, a car (FIG. 11a), or two cars (FIG. 11b).
Figure 11B:
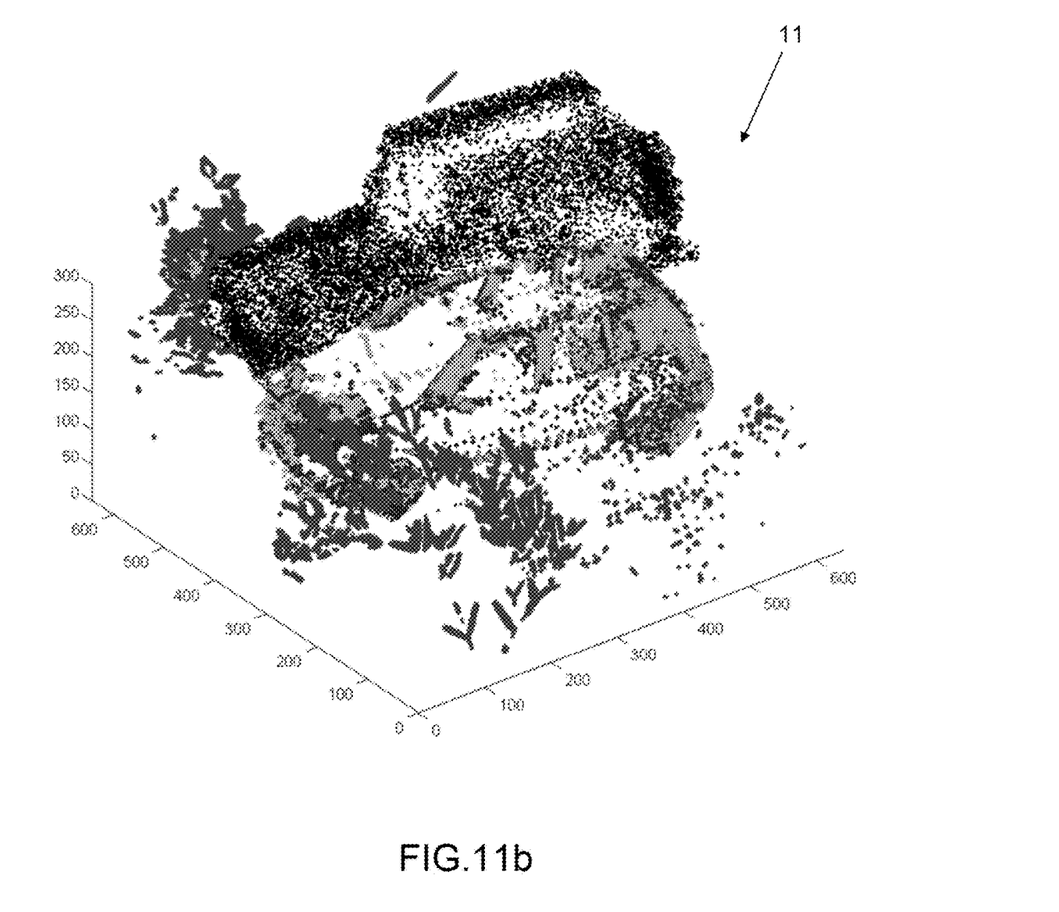

The discrimination and identification method according to the invention comprises the following steps described in relation to FIG. 2. An object denotes one or more elements of the scene: an object can be a car as shown in the examples of FIGS. 2 to 11a, or two cars as shown in the example of FIG. 11b, or even a car element like the rim.

Out of the following steps, some require the participation of an operator from an on-screen visualization, others are implemented automatically.

Figure 3:
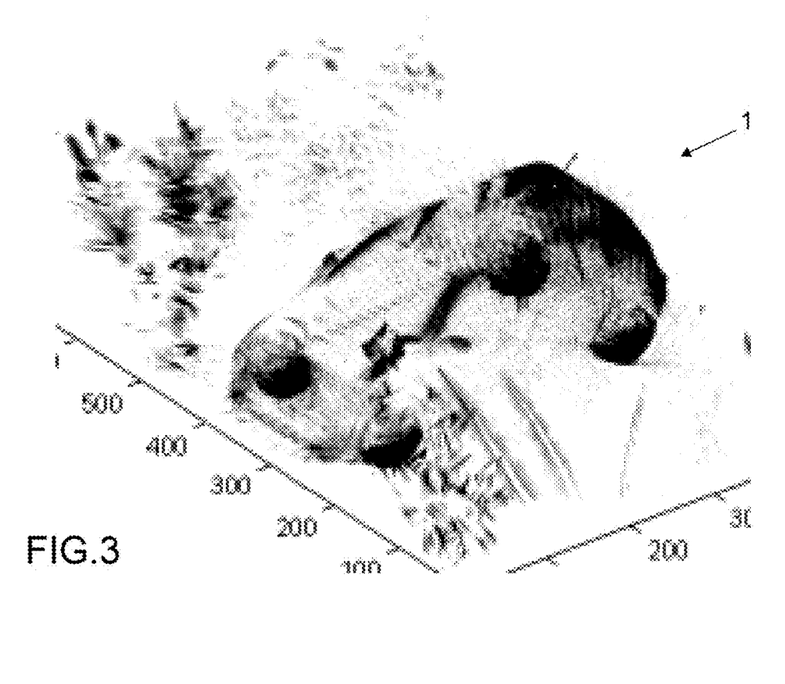
FIG. 3 shows an example of 3D visualization of a 3D voxel volume of a complex scene, without the meshing and obtained by 3D reconstruction.
Figure 5:
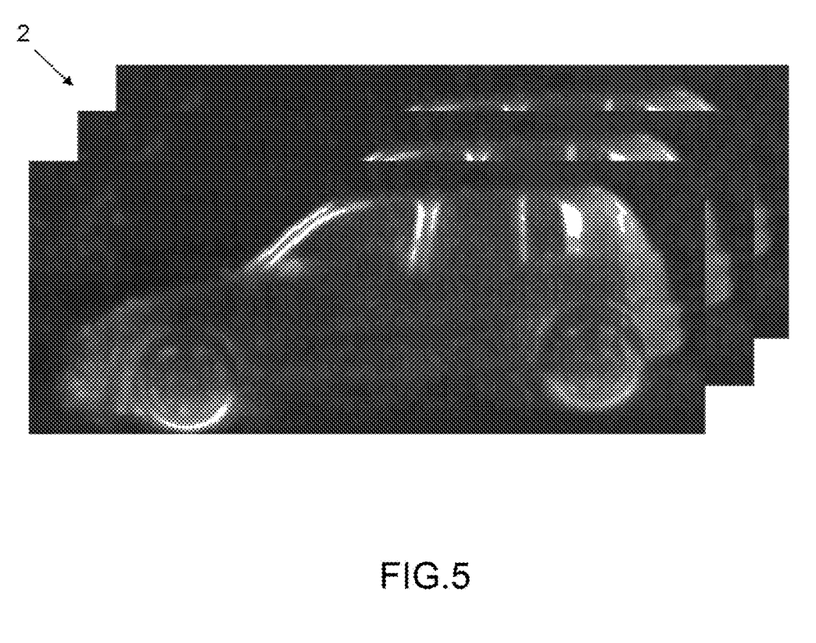
FIG. 5 shows an example of sequence of 2D MIP images of an object to be identified.

A) from the 3D voxel volume (1) of the complex scene (represented in FIGS. 2 and 3 without the meshing of the voxels), the MIP technique is used for the operator to visualize in real time on his or her screen for example the complex scene according to different projection planes (corresponding to different observation angles) and according to an intensity threshold determined by trial and error by the operator, and for, during these different visualizations of which an example is shown in FIG. 4, him or her to roughly break down the volume to be analyzed including an object that he or she wants to discriminate and/or identify. At the end of this iterative process of MIP type, a sequence of 2D MIP images (2) of the object to be identified has been generated, which corresponds visually to a reduced 3D volume containing the object to be identified, but this reduced volume is not yet determined at this stage. An example of such a sequence of three 2D MIP images (2) is shown in FIGS. 2 and 5.

B1) automatically extracting, from this sequence of 2D MIP images (2), coordinates (3) of this reduced volume containing the object to be identified.

B2) determining one of the intensity thresholds (4) which was used in the MIP process of the step A); this threshold is determined by trial and error by the operator.

Figure 6:
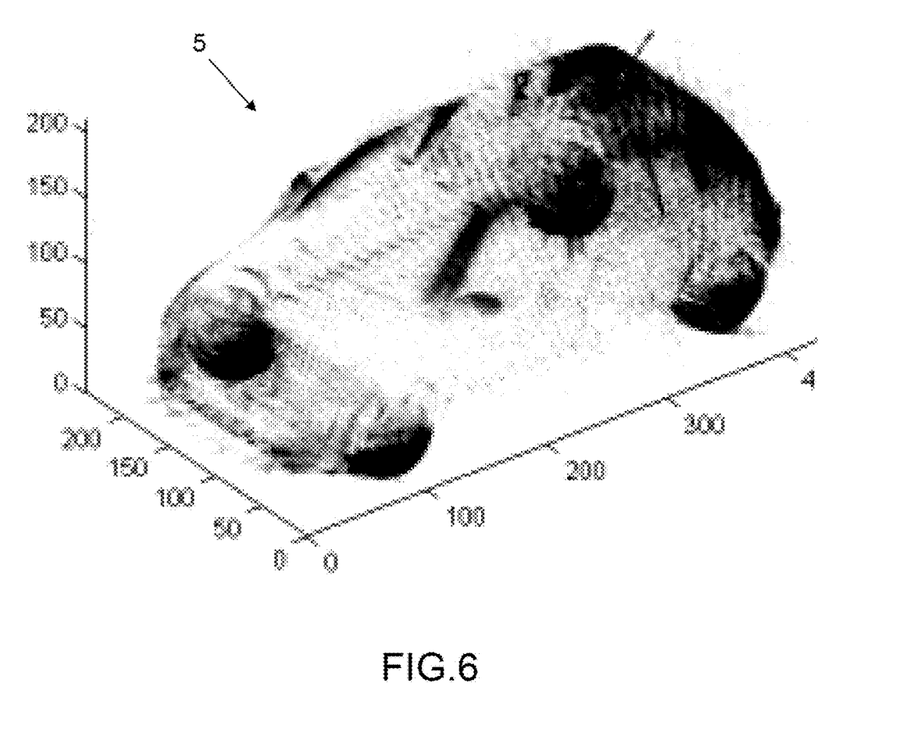
FIG. 6 shows an example of 3D visualization of the reduced 3D volume of the object to be identified.

C) automatically extracting, from the 3D voxel volume (1) of the complex scene, and by using the coordinates (3) and the intensity threshold (4), a voxel volume (5) corresponding to the object to be identified (in other words, this reduced 3D volume is determined as a function of the coordinates (3) and its voxels are thresholded in terms of intensity as a function of the intensity threshold (4)): this concerns the reduced volume of the step A). The operator can visualize this reduced volume (5) if he or she wants to, as shown in FIGS. 2 and 6; this visualization can offer him or her a possibility of identifying the object.

D) automatically generating, from the voxel volume (5), by a process of intensity threshold optimization, each intensity being associated with a color:
an optimized threshold (7),
then by using this optimized threshold, an optimized 3D voxel volume (6) of the object to be identified.

Figure 7:
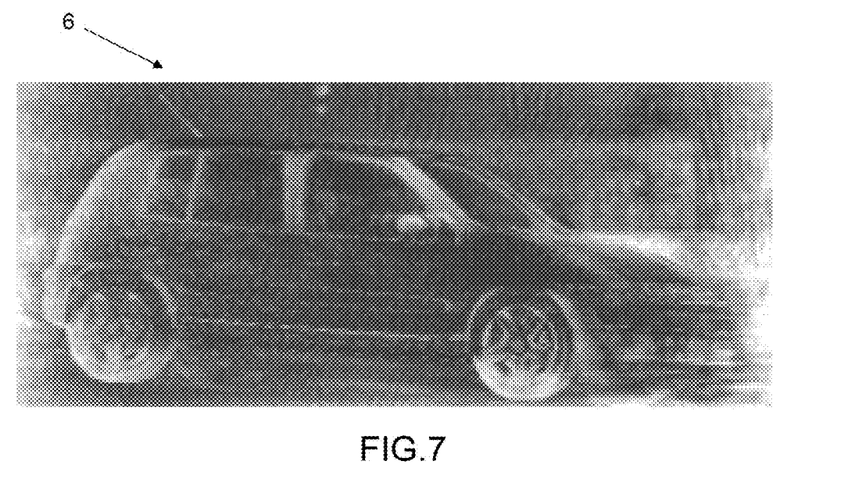
FIG. 7 shows an example of 3D visualization of the optimized 3D volume of the object to be identified.

The reduced volume, that the operator can also visualize as shown in FIGS. 2 and 7, and identify, is thus as it were obtained, in color after thresholding. A 3D voxel volume is obtained which visually presents much more detail than the original 3D volume.

During the preceding steps, A to C, the operator has had the possibility of identifying the object with an increasing probability. At the end of this step D, the operator has achieved the strongest probability of identifying the object.

The object to be identified can itself be divided into subobjects. The subobjects of a car are for example the wheels, the trunk lid, etc. The preceding steps are then applied to each subobject. For each subobject, a sequence of 2D MIP images (2), reduced 3D volume coordinates (3), a chosen intensity threshold (4), a reduced 3D voxel volume (5), an optimized threshold (7) and an optimized 3D volume (6) are obtained.

At the end of this step D, when the object comprises several elements or subobjects that are of interest to the operator, these have been able to be discriminated.

The following steps aim to re-situate the identified object.

Figure 8:
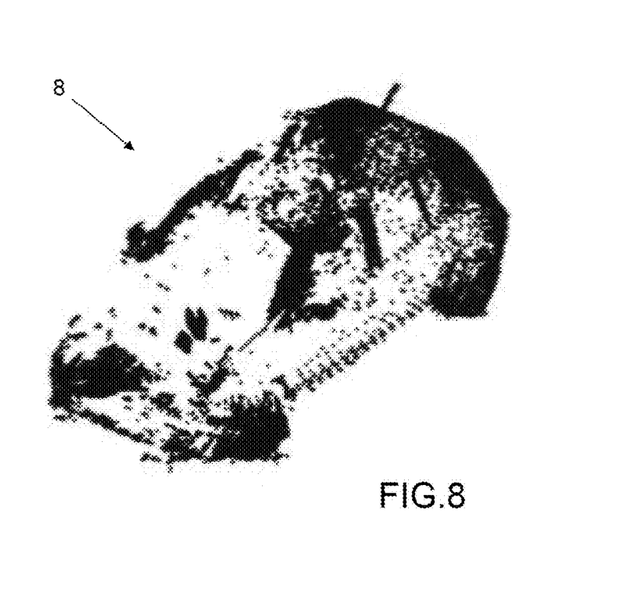
FIG. 8 shows an example of 3D visualization of a 3D MIP cloud of points of the object to be identified.

E) optionally, automatically generating, from the sequence of 2D MIP images (2) by using the coordinates (3) and the intensity threshold (4), a 3D cloud of points (8) of the object to be identified, that the operator can optionally visualize, as shown in FIGS. 2 and 8.

Figure 9:
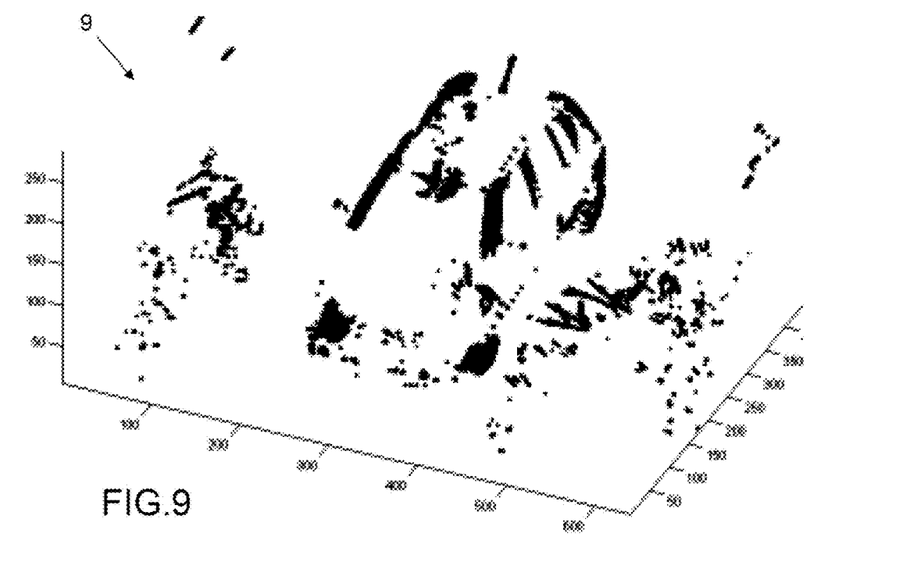
FIG. 9 shows an example of 3D visualization of a raw 3D cloud of points of the complex scene.

F1) automatically generating, from the sequence of 2D MIP images (2) and by using the intensity threshold (4), a raw 3D cloud of points (9) of the complex scene therefore including the object to be identified, that the operator can optionally visualize, as shown in FIGS. 2 and 9.

Figure 10:
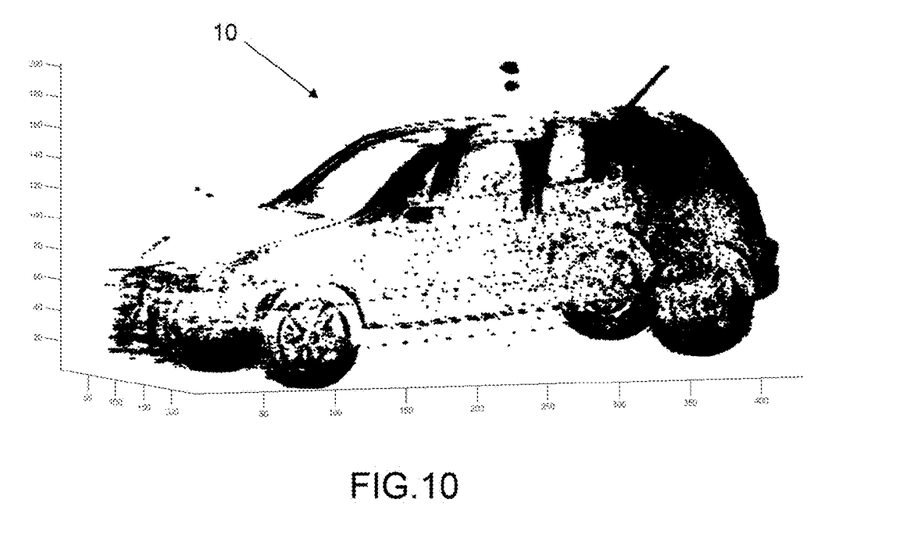
FIG. 10 shows an example of 3D visualization of an optimized 3D cloud of points of the object to be identified.

F2) automatically generating, from the optimized 3D voxel volume (6) and by using the intensity threshold (7), an optimized 3D cloud of points (10) of the object to be identified, that the operator can optionally visualize, as shown in FIGS. 2 and 10.

G) automatically generating, by overlaying:
of the raw 3D cloud of points (9) of the complex scene,
of the optimized 3D cloud of points (10) of the object, which exhibits a high density at the level of the details of the object allowing it to be identified,
and of the 3D cloud of points (8) of the object if it has been generated, an optimized global 3D cloud of points (11) of the object included in the complex scene. This cloud makes it possible to position the object in its operational context by taking into account the absolute coordinates, to discriminate it, to assist the operator in identifying it with a strong probability. In effect, the operator visualizes this optimized global cloud (11), an example of which is shown in FIGS. 2 and 11a for an object which represents a car or FIG. 11b for an object which represents two cars; that allows him or her to visualize the identified object in its operational context.

The various extractions of the clouds of points allow the artefacts and noise to be reduced.

The set of the clouds of points associated with the object is positioned in an absolute Cartesian reference frame, which makes it possible to simply calculate the position of the object and the various distances between the object and other elements of the scene. The object is replaced in its operational context.

When subobjects have been identified, each of these re-situating steps is applied by overlaying the clouds respectively obtained from each subobject.

When the operator considers that the result is unsatisfactory, these steps A to G can be iterated in order to obtain the best possible densification of these details.

At the end of the step G, when the object comprises several mutually discriminated elements or subobjects, these are replaced in their context and their positioning, relative to one another, can be measured in Cartesian coordinates.

With this method, it is particularly easy to visualize in real time the various elements of the scene observed.

According to the invention, the identification of the objects of the scene is improved by virtue of a densification of the three-dimensional cloud of points.

This discrimination and identification method applies notably to the field of security for the accurate identification and locating of targets, and to the medical field for the identification and locating of tumors.

The present invention can be implemented from hardware and/or software elements. It can be available as computer program product on a computer-readable medium, this computer program comprising code instructions making it possible to perform the steps of the discrimination and identification method. The medium can be electronic, magnetic, optical, electromagnetic or be a broadcast medium of infrared type. Such media are for example semiconductor memories (Random Access Memory RAM, Read-Only Memory ROM), tapes, diskettes or magnetic or optical disks (Compact Disc-Read Only Memory (CD-ROM), Compact Disc-Read/Write (CD-R/W) and DVD).

Although the invention has been described in relation to particular embodiments, it is obvious that it is in no way limited thereto and that it includes all the technical equivalents of the means described as well as their combinations provided that the latter fall within the scope of the invention.

The invention claimed is:

1. A method for discriminating and identifying, by 3D imaging, an object in a complex scene comprising the following steps:
A) generating a sequence of images called two-dimensional (2D) maximum intensity projection (MIP) images of the object, from a three-dimensional (3D) voxel volume of the complex scene, this volume being predetermined and visualized by an operator by using an iterative process of "MIP" type from a projection plane and an intensity threshold determined by the operator on each iteration,
B1) automatically extracting from the sequence of 2D MIP images, coordinates of a reduced volume corresponding to the sequence of 2D MIP images,
B2) choosing one of the intensity thresholds used during the iterations of the step A), this choice being made by the operator,
C) automatically extracting, from the 3D voxel volume of the complex scene, from the coordinates and from the chosen intensity threshold, a reduced 3D voxel volume containing the object,
D) automatically generating from the reduced volume, by intensity threshold optimization, an optimized intensity threshold and an optimized voxel volume of the object, a color being associated with each intensity, E) automatically generating, from the coordinates of the voxels whose intensity is represented by the 2D MIP images and from the chosen intensity threshold, a 3D cloud of points of the object, F1) automatically generating, from the 3D volume of the complex scene and from the chosen intensity threshold, a raw 3D cloud of points of the complex scene, F2) automatically generating, from the optimized 3D voxel volume and from the optimized intensity threshold, an optimized 3D cloud of points of the object, G) automatically generating, from an overlaying of the 3D cloud of points of the object, and of the optimized 3D cloud of points of the object, and of the raw 3D cloud of points of the complex scene, an optimized global 3D cloud of points of the object included in the complex scene, visualizing the optimized global 3D cloud, identifying the object by the visualization, and if the visualization is not satisfactory, iterating the previous steps to obtain a densification of the 3D clouds of points.

2. The method for discriminating and identifying an object in a complex scene as claimed in claim 1, comprising a step of visualization of the reduced 3D voxel volume.

3. The method for discriminating and identifying an object in a complex scene as claimed in claim 1, comprising a step of visualization of the optimized 3D voxel volume of the object.

4. The method as claimed in claim 1 wherein the 3D cloud of points of the object and/or the raw 3D cloud of points of the complex scene and/or the optimized 3D cloud of points of the object is displayed by the operator.

5. The method as claimed in claim 1, wherein the 3D voxel volume of the complex scene is obtained by reflection of a visible or infrared radiation (IR) optical wave on the complex scene or by thermal emission from the object.

6. A non-transitory computer-readable medium comprising instructions that, when executed by a computer, cause the computer to perform the method as claimed in claim 1.

* * * * *